Figure 1:
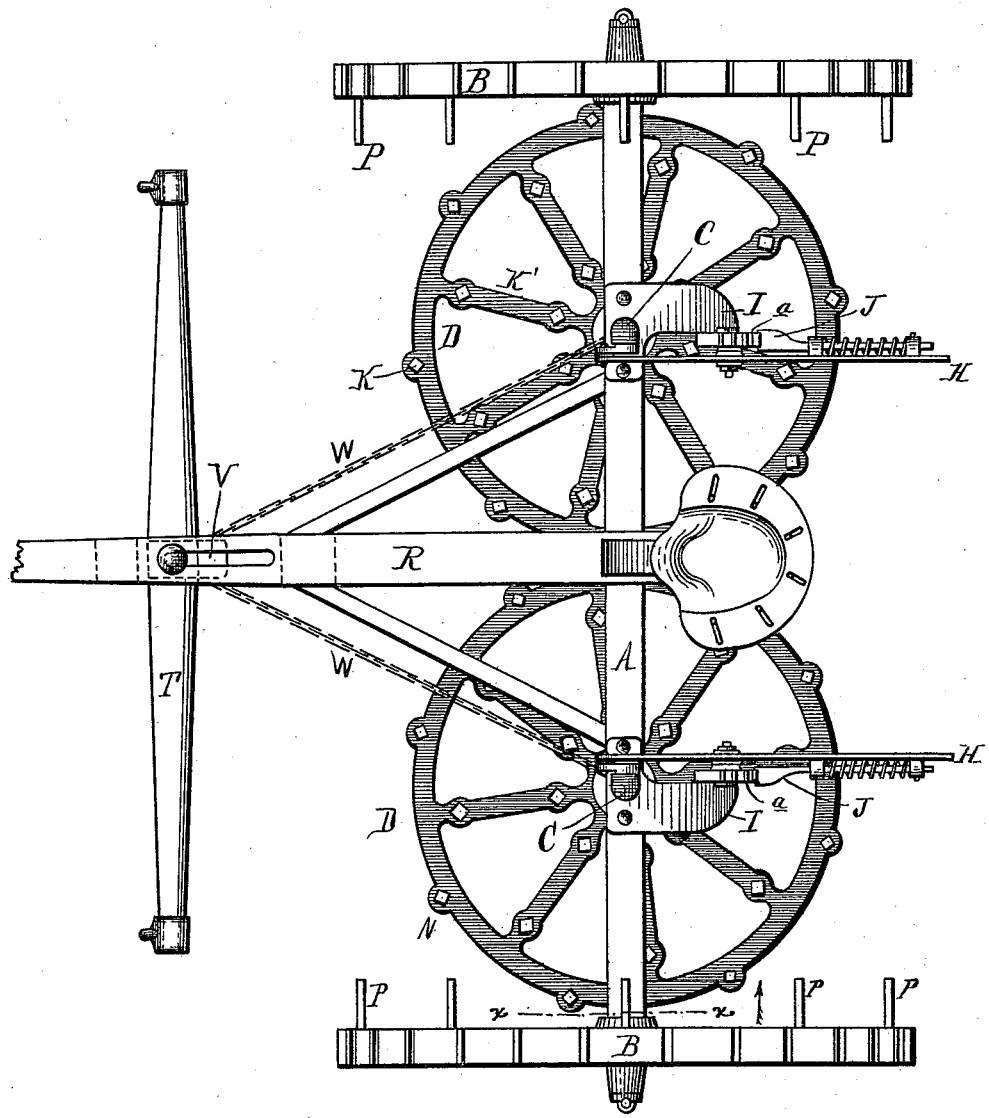

(No Model.) 2 Sheets—Sheet 1.

I. E. STUMP.
ROTARY HARROW.

No. 449,833. Patented Apr. 7, 1891.

Witnesses.
W. R. Edelen.
J. A. Osborne

Inventor.
Ira E. Stump
By Osborne & Co
Attys.

(No Model.) 2 Sheets—Sheet 2.
I. E. STUMP.
ROTARY HARROW.
No. 449,833. Patented Apr. 7, 1891.
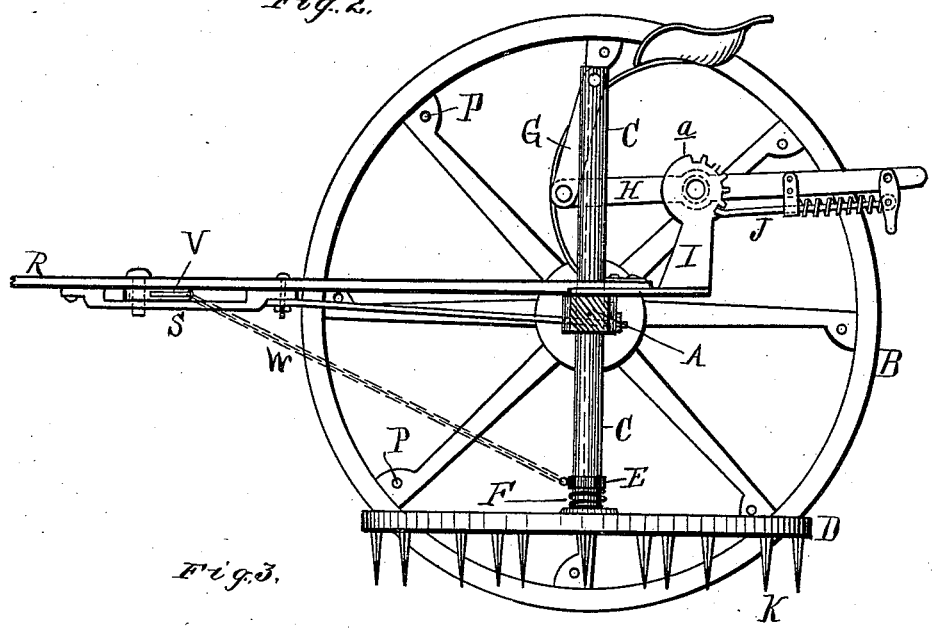
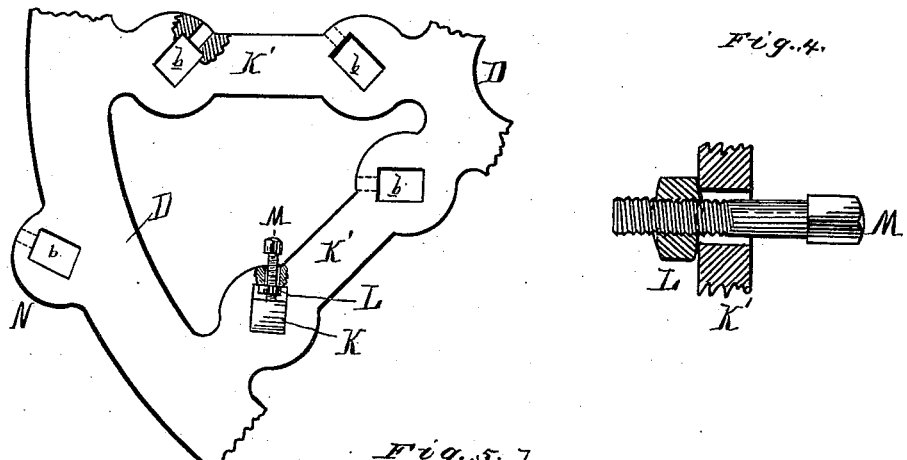
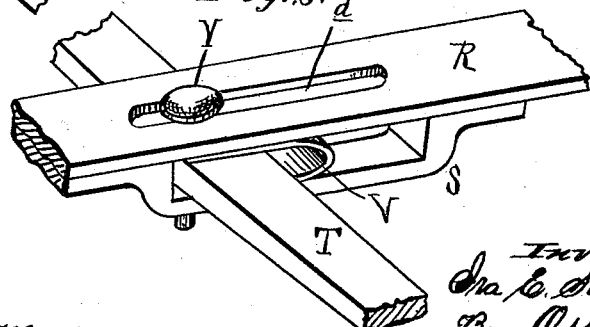
Witnesses.
W. R. Edelen.
J. A. Osborne.
Inventor.
Ira E. Stump
By Osborne & Co.
Atty's.

UNITED STATES PATENT OFFICE.

IRA E. STUMP, OF CLEVELAND, OHIO, ASSIGNOR TO CALVIN S. PIERCE, OF SAME PLACE.

ROTARY HARROW.

SPECIFICATION forming part of Letters Patent No. 449,833, dated April 7, 1891.

Application filed January 30, 1890. Serial No. 338,573. (No model.)

*To all whom it may concern:*

Be it known that I, IRA E. STUMP, a citizen of the United States, residing at Cleveland, in the county of Cuyahoga and State of Ohio, have invented certain new and useful Improvements in Rotary Harrows, of which the following, with the accompanying drawings, is a specification.

My invention relates to that class of harrows in which the parts to which the teeth are secured are caused to rotate as the harrow is drawn forward, and is especially designed as an improvement upon Letters Patent issued to me January 1, 1889, No. 395,364.

The invention consists in the peculiar construction, arrangement, and combination of the various parts, all as more fully hereinafter set forth and claimed.

Figure 1 is a top plan. Fig. 2 is a side elevation with one of the traction-wheels removed. Figs. 3, 4, and 5 are details of construction enlarged.

In the accompanying drawings, which form a part of this specification, A represents the axle upon which the traction-wheels B are mounted.

C C represent spindles, which project up through and have a vertical movement in suitable openings in said axle. Upon the lower ends of these spindles is properly journaled a horizontally-rotating harrow D. A collar E is rigidly secured upon each of these spindles C, as shown, and between these collars and the hubs of the harrows and around the spindle is placed a coil-spring F. The upper end of each spindle is connected by means of a link or strap G to the end of a lever H, which latter is fulcrumed in the head of a rearwardly-projecting bracket I. The heads of these brackets are each provided with a toothed segment $a$, with which the spring dogs or detents J are designed to engage. By this construction and arrangement of the parts it will be observed that the operator can vertically adjust the harrows, so as to harrow shallow or deep, as may be desired, and when passing from field to field can so elevate them that they will entirely clear the ground.

The teeth K of the harrows are secured in place as follows: In each arm K' or spoke of the harrow are formed two vertical diamond-shaped openings $b$, sufficient in size to receive the teeth K and a nut L. M is a threaded bolt, which passes through one wall of the opening $b$, and is tapped through the nut L, its inner end, when the bolt is screwed up, clamping the tooth in place. Upon the periphery of the harrow are formed lugs N, in which harrow-teeth are similarly secured.

Projecting inwardly from the traction-wheels B is a series of spurs P, said spurs being arranged to engage with the teeth secured in the periphery of the harrows D, thereby causing the latter to rotate as the device is drawn forward.

R represents the tongue or pole, which is rigidly secured at its rear end to the axle.

S is a clip or stirrup secured to the under side of the pole, and through this clip the doubletree T passes. At the longitudinal center of this doubletree is secured a draft-strap V, and W is a draft-chain or cable that passes through said strap V, as shown, the ends of said chain being connected to the collars E upon the harrow-spindles.

The doubletree is secured in place by a bolt Y, that passes down through a slot $d$ in the tongue, through the doubletree and through a slot in the stirrup S, this latter slot not being shown; but it is coincident with the slot in the tongue. By this construction and arrangement of the parts it will readily be seen that the draft upon the harrows is equalized whether they be upon the same horizontal plane or not. The coil-springs F permit the harrows to vertically adjust themselves in passing over obstructions.

I am aware that set-screws have been heretofore employed for retaining teeth in harrows—for example, the means shown in Hulings's patent, No. 234,576, November 16, 1880—and I make no claim to the invention therein shown.

What I claim as my invention is—

The combination of the axle A, wheels B, carrying spurs P, spindles C, harrows D, collar E, springs F, links G, levers H, brackets I, spring-detents J, pole R, clip S, doubletree T, draft-strap V, and draft-chain W, substantially as and for the purposes set forth.

In testimony whereof I affix my signature, in presence of two witnesses, this 27th day of January, 1890.

IRA E. STUMP.

Witnesses:
H. S. SPRAGUE,
JOS. A. OSBORN.